United States Patent [19]
Nakamura

[11] Patent Number: 5,953,103
[45] Date of Patent: Sep. 14, 1999

[54] COLOR PRINTER

[75] Inventor: Hiroaki Nakamura, Kanagawa, Japan

[73] Assignee: Fuji Photo Film Co., Ltd., Kanagawa, Japan

[21] Appl. No.: 08/864,986

[22] Filed: May 29, 1997

[30] Foreign Application Priority Data

May 30, 1996 [JP] Japan ................................. 8-137297

[51] Int. Cl.$^6$ ............................ G02B 26/08; G02B 27/52
[52] U.S. Cl. ............................ 355/32; 355/35; 347/239; 347/255; 359/292
[58] Field of Search .......................... 355/32, 35, 38; 347/135, 238, 239, 255; 359/223, 224, 292

[56] References Cited

U.S. PATENT DOCUMENTS

| | | | |
|---|---|---|---|
| 4,954,789 | 9/1990 | Sampsell | 359/292 |
| 5,041,851 | 8/1991 | Nelson | 346/160 |
| 5,461,410 | 10/1995 | Venkateswar et al. | 347/240 |
| 5,504,504 | 4/1996 | Markandey et al. | 345/214 |
| 5,539,568 | 7/1996 | Lin et al. | 359/285 |
| 5,631,782 | 5/1997 | Smith et al. | 359/224 |

OTHER PUBLICATIONS

N. Nishida: "Micro machines and optical techniques (2), Digital micromirror devices (DMD) and their applications to displays", *O plus E* (a magazine), Oct. of 1994, No. 179, pp. 90–94.

G.A. Feather "Micromirrors And Digital Processing", May 1995 issue of *Photonics Spectra*, pp. 118–124.

G. Um, D. Foley, A. Silagyi, J.B. Ji, Y.B. Jeon and Y.K. Kim "Recent Advance In actuated Mirror Array (AMA) Projector Development", *Asia Display* 1995, pp. 95–98.

W.E. Nelson and R.L. Bhuva "Digital Micromirror Device Imaging Bar For Hardcopy", *SPIE*, vol. 2413, pp. 58–65.

J.M. Youse "Mirrors On A Chip", Nov. 1993 issue of *IEEE Spectrum*, pp. 27–31.

*Primary Examiner*—Alan A. Mathews
*Attorney, Agent, or Firm*—Sughrue, Mion, Zinn, Macpeak & Seas, PLLC

[57] ABSTRACT

A color printer prints a color image on photosensitive material by utilizing a digital micromirror device. The digital micromirror device is provided with four micromirror arrays constituted of plural micromirrors. The four micromirror arrays record four lines on a photographic paper at the same time while the photographic paper is successively advanced at constant velocity. Red exposure sequence, green exposure sequence and blue exposure sequence are performed in order while the photographic paper is advanced by L. Each of the exposure sequences is changed in order every advancement of photographic paper by L/3. The photographic paper passes through four lines projected by the four micromirror arrays in order. Accordingly, a pixel on the photographic paper is exposed four times at the ceiling by four micromirrors arranged on a same row for each color. Accordingly, multiple exposure is performed during advancement of the photographic paper.

10 Claims, 12 Drawing Sheets

FIG. 6

| MIRROR LINE | LEVEL "0" DATA "000" | LEVEL "1" DATA "001" | LEVEL "2" DATA "010" | LEVEL "3" DATA "011" | LEVEL "4" DATA "100" |
|---|---|---|---|---|---|
| 1 | 0 | 1 | 1 | 1 | 1 |
| 2 | 0 | 0 | 1 | 1 | 1 |
| 3 | 0 | 0 | 0 | 1 | 1 |
| 4 | 0 | 0 | 0 | 0 | 1 |

FIG. 10

| MIRROR LINE | LEVEL "0" DATA "000" | LEVEL "1" DATA "001" | LEVEL "6" DATA "110" | LEVEL "7" DATA "111" |
|---|---|---|---|---|
| 1 | 00 | 10 | 11 | 10 |
| 2 | 00 | 00 | 11 | 11 |
| 3 | 00 | 00 | 11 | 11 |
| 4 | 00 | 00 | 00 | 11 |

FIG. 13

| MIRROR LINE | LEVEL "0" DATA "000" | LEVEL "1" DATA "001" | ... | LEVEL "6" DATA "110" | LEVEL "7" DATA "111" |
|---|---|---|---|---|---|
| 1 | 00 | 10 | | 11 | 10 |
| 2 | 0 | 0 | | 1 | 1 |
| 3 | 0 | 0 | | 1 | 1 |
| 4 | 0 | 0 | | 0 | 1 |

COLOR PRINTER

BACKGROUND OF THE INVENTION

1. Field of the Invention

The present invention relates to a color printer for recording a color image in photosensitive material and more particularly to a color printer utilizing a micromirror device in which small size mirrors are disposed in matrix.

2. Description of the Related Art

A micromirror device having extremely small-sized mirrors (hereinafter micromirror) is suggested. The micromirrors are arranged in line or in matrix and the tilt angle of each micromirror is controlled to deflect the incident-light. The micromirror devices include digital micromirror devices (DMD) which tilt each micromirror by electrostatic force, piezoelectric drive type micromirror device (AMA) which tilt each micromirror by a fine piezoelectric element and the like.

For example, in a digital micromirror device, each of the micromirrors keeps horizontal state when a power supply is off and is capable of swinging between a valid reflection state (ON-state) and an invalid reflection state (OFF-state) according to one bit mirror drive data value written to a memory cell. In the valid reflection state, the micromirror tilts by $+\theta$ relative to a vertical line. In the invalid reflection state, the micromirror tilts by $-\theta$ relative to a vertical line.

The digital micromirror device is obliquely lighted by parallel rays from a light source. While the micromirror is set in the valid reflection state, spot light reflected by the micromirror is guided to an image forming optical path. A projector lens is disposed at the image forming optical path so that spot light is projected on an image formation face of photosensitive recording medium via the projector lens. While the micromirror is set in the invalid reflection state, spot light reflected by the micromirror is guided to an eliminating optical path. The spot light is absorbed by a light absorption member for example.

The digital micromirror device may be utilized for a projector or a printer as a image forming device. About utilization for the projector, it is described in a monthly magazine "O plus E", October, 1994, pp. 90–94. About utilization for the printer of electrophotography type, it is described in "Digital Micromirror Device bar for hardcopy", Vol 2413, 1995, SPIE.

In the projector described in the foregoing document, an area-type digital micromirror device is employed and image of one frame is projected on a screen. The area-type digital micromirror device is provided with N micromirror arrays which are arranged side by side. Each of the micromirror arrays is provided with M micromirrors which are disposed in line.

For medium contrast image, amount of the spot light projected on the screen is controlled by means of pulse width modulation (PWM). The highest bit of K-bit image data is picked up and written to the micromirror device as a mirror drive data. Reflection state of the micromirror is set in accordance with a value of the one bit mirror drive data. Next, the second highest bit of K-bit image data is picked up and written to the micromirror device. The pulse width modulation of the image data is performed by reducing write cycle of the mirror drive data to half. When the value of the image data is large, total time of the valid reflection state becomes long so that great amount of the spot light is projected. When the value of the image data is small, small amount of the spot light is projected.

The area-type digital micromirror device may be employed in the electrophotography-type printer as well. During rotation of photosensitive drum, N micromirror arrays are driven at the same time in accordance with the image data of first to Nth lines to expose the N lines of the image data on the photosensitive drum. In order to reduce the unsharp of line due to the rotation of the photosensitive drum, exposure time is set at 10% of the movement time of one line.

On an outer peripheral surface of the photosensitive drum, electrostatic latent image is formed by the digital micromirror device. The electrostatic latent image is developed and converted to toner image. The toner image is transferred to a plain paper. On each line of the electrostatic latent image, line multiple exposure is performed by N micromirror arrays. As to the line multiple exposure, the number of exposures is one of zero to N and determined on the basis of the image data. The line multiple exposure has an advantage that harmful effect due to nonuniformity of light or scatter of operational speed of the micromirror is reduced.

A method for recording a high gradation image is disclosed in Japanese Patent Laid-open Publication No. 7-131648 which is Japanese counterpart of U.S. patent application No. 038,391 filed on Mar. 29, 1993. In the method, for some of N micromirror arrays, time of the valid reflection state thereof is changed during each exposure. And for the rest of the N micromirror arrays, the time of the valid reflection state is fixed during each exposure.

It is possible to realize a color printer for recording a color image in photosensitive material by utilizing the above-described micromirror device. In this case, three kinds of light sources, namely light sources of red, green and blue, are necessary. The photosensitive material is intermittently advanced one line by one line and the three colors are recorded in order while the photosensitive material is stopped. In such a case, it is difficult to locate the photosensitive material every one line so that it is impossible to advance the photosensitive material at high speed. As a consequence of that, there arises a problem in that it takes time to print the color image.

SUMMARY OF THE INVENTION

It is a primary object of the present invention to provide a color printer in which a color image is recorded in photosensitive material at high speed.

It is a second object of the present invention to provide a color printer in which three kinds of exposures are performed while the photosensitive material is advanced.

In order to active the above and other objects, the color printer according to the present invention comprises a digital micromirror device. The digital micromirror device is provided with N (N is an optional natural number) micromirror arrays each of which is constituted of M (M is an optional natural number) micromirrors disposed in line. The micromirror is changeable between a valid reflection state and an invalid reflection state. In the valid reflection state, the micromirror reflects the light to an image forming optical path to print an image on a photosensitive material. In the invalid reflection state, the micromirror reflects the light to an eliminating optical path to absorb the light.

In a preferred embodiment, the digital micromirror device is provided with four micromirror arrays juxtaposed each other. The four micromirror arrays project the light on the photosensitive material at the same time while the photosensitive material is successively advanced at constant velocity. In other words, exposure sequence are performed while the photosensitive material is successively advanced.

As the exposure sequence, there are a first exposure sequence, a second exposure sequence and a third exposure sequence to print a color image. In the first exposure sequence, light of first wavelength band is use as the projected light. Similarly, in the second exposure sequence, light of second wavelength band is used, and in the third exposure sequence, light of third wavelength band is used. Each of the exposure sequences is performed in order while the photographic material is advanced by predetermined length L. In a preferred embodiment, the predetermined length L is corresponding to width of projected light from each micromirror array. Each of the exposure sequences is changed in order every advancement of the photosensitive material by L/3.

The photosensitive material is exposed by the four micromirror arrays in order so that, in this case, a pixel on the photosensitive material is exposed four times at the ceiling relative to each exposure sequence. Accordingly, multiple exposure is performed during the advancement of the photosensitive material so that the pixel is recorded in any density.

With respect to the photosensitive material, color silver salt photosensitive material is employed. As the color silver salt photosensitive material, there are color photographic paper of negative-positive type, color photographic paper of positive-positive type, color negative film, color positive film and so forth.

In the first exposure sequence, as the light of first wavelength band, the light of red sensitive range is used for the color silver salt photosensitive material. In the second exposure sequence, the light of green sensitive range is used as the light of second wavelength band. And in the third exposure sequence, the light of blue sensitive range is used as the light of third wavelength band.

According to the present invention, three kinds of exposure sequences are performed in order at predetermined cycle during advancement of the photosensitive material so that printing is carried out in short time. Further, unevenness of exposure for each line may be reduced by performing three kinds of exposure sequences during one-line advancement of the photosensitive material.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 6 is an explanatory diagram showing a look-up table;

FIG. 10 is an explanatory diagram showing a look-up table utilized in the embodiment relative to FIG. 9;

FIG. 13 is an explanatory diagram showing an another embodiment of the look-up table.

DETAILED DESCRIPTION OF THE PREFERRED EMBODIMENT(S)

Figure 1:
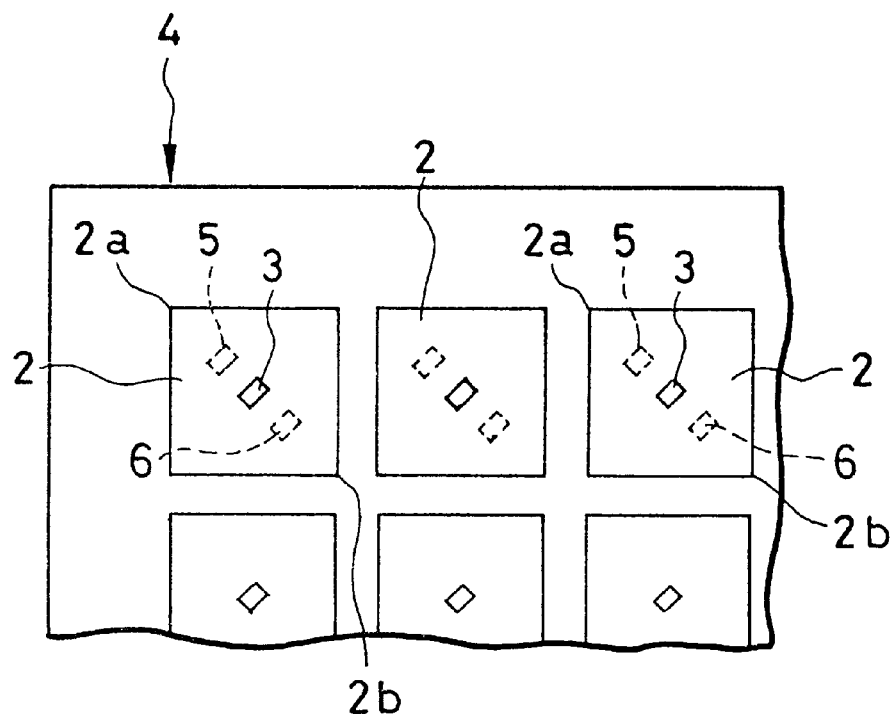
FIG. 1 is an explanatory view showing a digital micromirror device.

Referring to FIG. 1 illustrating a digital micromirror device, small micromirrors 2 are disposed in matrix. Each micromirror 2 is swingably supported above a static RAM (SRAM) 4 via a post 3 positioned at the central area of the micromirror 2. Each micromirror 2 is a square having a side length of, for example 16 μm, and is made of a metal thin film such as conductive aluminum.

Address electrodes 5 and 6 are formed on both sides of the post 3. The micromirror 2 is tilted by static electricity charged between the address electrodes 5 and 6 and the micromirror 2. Specifically, the micromirror 2 is tilted such that one of corners 2a and 2b on a diagonal line passing through the post 3 and the address electrodes 5 and 6 contacts a surface of a silicon substrate 4a of SRAM 4. In practice, corners on the other diagonal line are suspended by a pair of support posts via torsion hinges. Each constituent such as micromirror 2 and post 3 is fabricated by known transistor integration techniques.

Figures 2A, 2B, 2C:
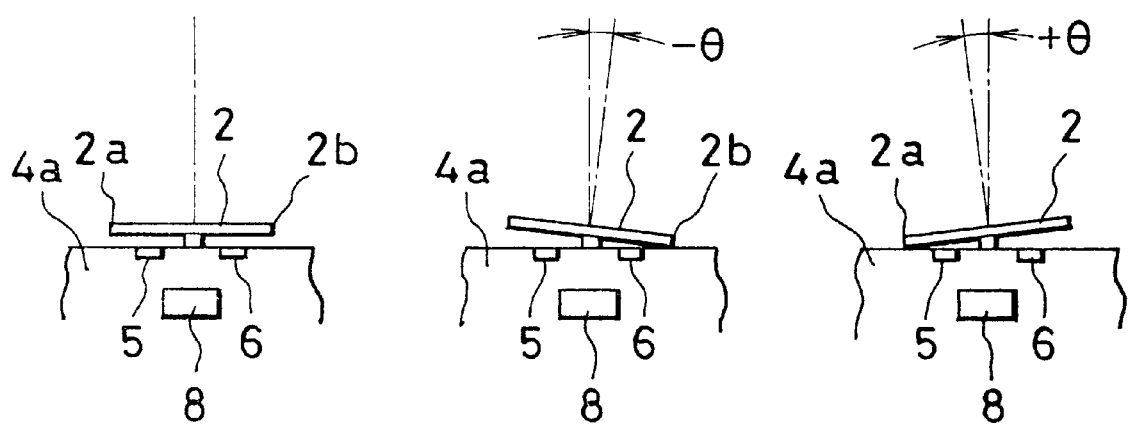
FIGS. 2A, 2B and 2C are explanatory views showing an operation of a micromirror.

As shown in FIGS. 2A to 2C, each micromirror 2 is disposed above each memory cell 8 of SRAM 4. Each memory cell 8 is constituted of a flip-flop having two transistors and memorizes one bit data. In an active state, one transistor of the flip-flop is ON and the other is OFF. The ON-state and OFF-state are inverted by a pulse (input data).

The transistors constituting the flip-flop are connected to the address electrodes 5 and 6 respectively. Therefore, one of the address electrodes 5 and 6 is plus, and the other is minus. The state of the address electrode is determined by a mirror drive data written to the memory cell 8. Upon applying a predetermined bias voltage to the micromirror 2, the micromirror 2 tilts to one of address electrodes 5 and 6 by static electricity charged between the address electrodes 5 and 6 and the micromirror 2.

While a power supply is OFF-state, the two transistors are OFF so that the address electrodes 5 and 6 do not receive application of any voltage. Further, the micromirror 2 does not also receive application of the bias voltage. Therefore, the micromirror 2 is horizontal as shown in FIG. 2A. Even if the mirror drive data is written to the memory cell 8, the micromirror 2 is horizontal when the bias voltage is not applied to the micromirror 2.

As mirror drive data "0" is written to the memory cell 8, the address electrode 5 becomes plus and the address electrode 6 becomes minus. Upon applying plus bias voltage to the micromirror 2, repulsive force is generated between the address electrode 5 and micromirror 2 and attractive force is generated between the address electrode 6 and micromirror 2. By these static electricity force, the micromirror 2 tilts until the corner 2b contacts the silicon substrate 4a as shown in FIG. 2B. At this time, a slant angle of the micromirror 2 is −θ.

As mirror drive data "1" is written to the memory cell 8, the address electrode 5 becomes minus and the address electrode 6 becomes plus. The micromirror 2 tilts by +θ as shown in FIG. 2C. Therefore, the micromirror 2 tilts by +θ or by −θ in accordance with the mirror drive data value.

The micromirror 2 has a horizontal state and two tilt states. The two tilt states are utilized when an image is printed. In one of the two tilt states, spot light travels from the micromirror 2 to form an image. For example, when the micromirror 2 takes +θ, spot light reflected by the micromirror 2 is guided to an image forming optical path and projected on a photosensitive material. When the micromirror 2 takes −θ, spot light is guided to an eliminating optical path. In this case, while the micromirror 2 takes +θ, a valid reflection state (ON state) maintains in which the spot light is utilized for print. And while the micromirror 2 takes −θ, an invalid reflection state (OFF state) maintains in which the spot light is not utilized for print.

Figure 3:
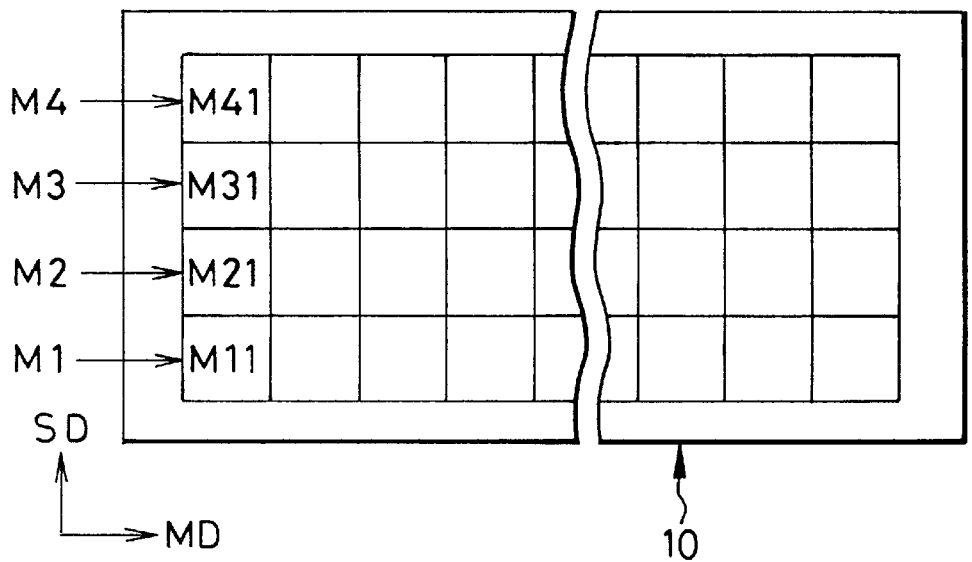
FIG. 3 is an explanatory plan view showing an embodiment of the digital micromirror device.

FIG. 3 shows a digital micromirror device in which the micromirrors are disposed in matrix. The digital micromirror device 10 comprises a first micromirror array M1, a second micromirror array M2, third micromirror array M3 and a fourth micromirror array M4 which are disposed parallel to each other in sub-scanning direction SD. Each of the micromirror arrays M1 to M2 comprises a plurality of micromirrors disposed in line. Reference numerals are given only to the micromirrors of a first row arranged in the sub-scanning direction SD. As shown in FIG. 1, a small space is formed between adjacent two micromirrors. However, for simplicity of the drawing, the micromirrors 10a in FIG. 3 are shown in contact with each other.

Figure 4:
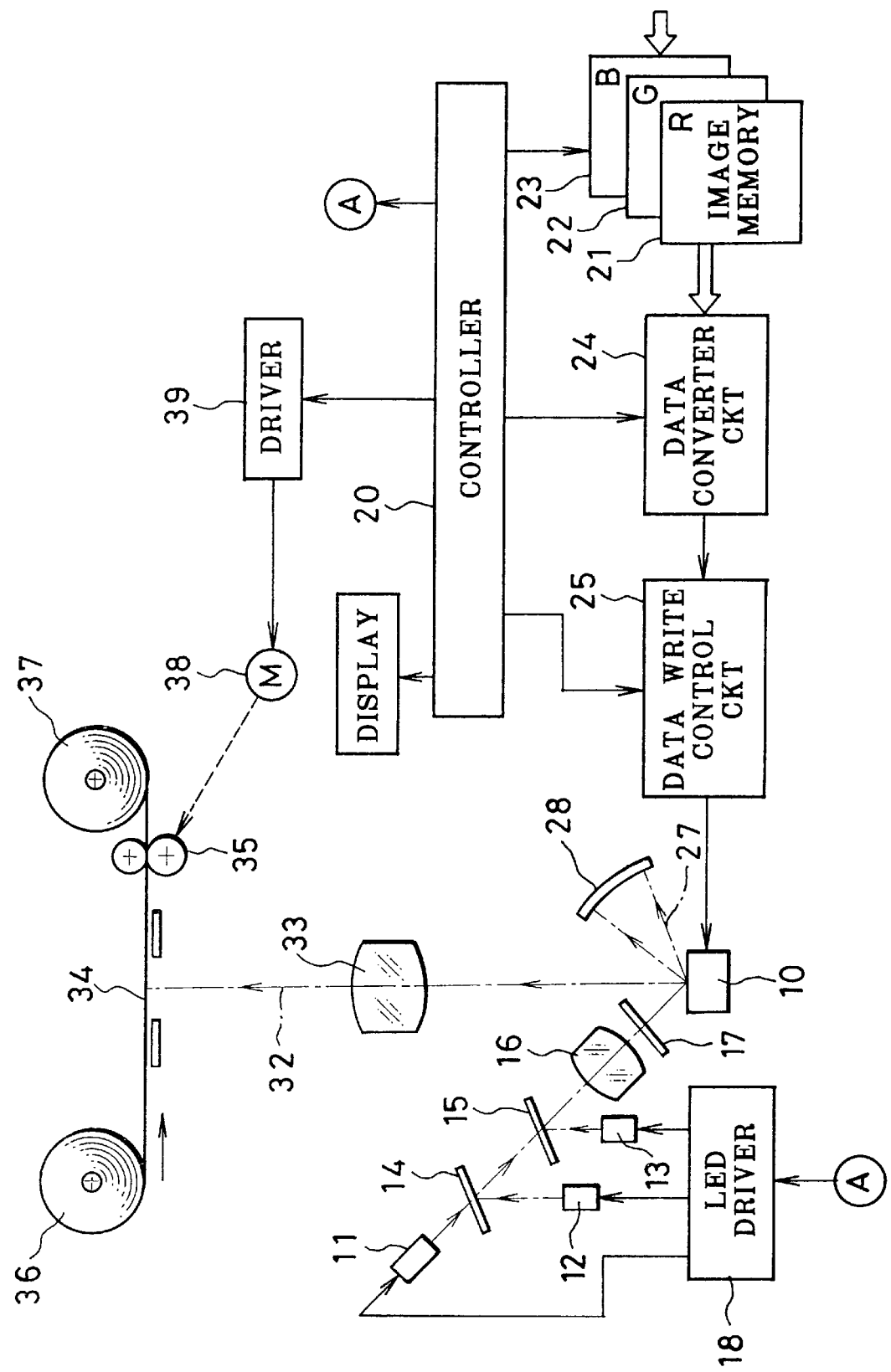
FIG. 4 is a schematic diagram of a color printer.

FIG. 4 shows a color printer utilizing the digital micromirror device. Response speed of the digital micromirror device 10 is about 15 μs so that it is necessary to use a light source having response speed corresponding to that of the digital micromirror device 10. In this embodiment, a red LED unit 11, a green LED 12 unit and a blue LED unit 13 are employed as the light sources. The red LED unit 11 has a number of red LEDs formed on a substrate in matrix and radiates light in frame. The green LED unit 12 and the blue LED unit 13 are respectively constructed similar to the red LED unit 11. Further, as the light source, a LED unit of complex type may be used. The complex type LED unit has LEDs each of which is provided with light emitting elements of three colors. The light emitting elements are selectively actuated to emit the light of any color.

Red light from the red LED unit 11 transmits through a dichroic mirror 14 reflecting green light and a dichroic mirror 15 reflecting blue light. This red light is paralleled by a lens 16 and applied to the digital micromirror device 10. Green light from the green LED unit 12 is reflected by the dichroic mirror 14 and applied to the digital micromirror device 10 after transmitting through the dichroic mirror 15 and the lens 16. Blue light from the blue LED unit 13 is reflected by the dichroic mirror 15 and applied to the digital micromirror device 10 after transmitting through the lens 16. A balance filter 17 performs shading correction to illuminate the digital micromirror device 10 uniformly.

An LED driver 18 is controlled by a controller 20 to activate only the red LED unit 11 during red exposure, to activate only the green LED unit 12 during green exposure, and to activate only the blue LED unit 13 during blue exposure. Luminance of the LED unit 11 to 13 is adjusted by changing a duty factor of a drive pulse in accordance with, for example, sensitivity of the photosensitive material.

Red image memory 21, green image memory 22 and blue image memory 23 store three-color image data of one frame. Image memory corresponding to exposed color is read out. For example, when the red exposure is performed, red image data is read out from the red image memory 21 by four lines corresponding to the four micromirror arrays.

A data converter circuit 24 comprises a look-up table shown in FIG. 6 and converts the image data of each line to one-bit mirror drive data in accordance with position of driven micromirror array and value of the image data. A data write control circuit 25 picks up the mirror drive data and writes it to SRAM of the digital micromirror device 10 in synchronism with a write timing signal.

Instead of the SRAM, four shift registers into which four-bit mirror drive data are inputted and M×N latch arrays may be used. The four-bit mirror drive data are corresponding to the four micromirror arrays and outputted in parallel. The latch arrays latch the mirror drive data of four line converted to serial signal by the four shift resisters due to a latch signal at the same time. Each latch is constituted of flip-flop so that the reflection state of the micromirror is controlled by connecting two address electrodes to the flip-flop.

The micromirror 2 tilts by −θ in response to the mirror drive data "0" and maintains the invalid reflection state. At this time, the reflection light of the micromirror is guided to an eliminating optical path 27 and absorbed by a black color light absorbing plate 28. Spot light reflected by the micromirror 2 maintaining the horizontal state is also absorbed by the light absorbing plate 28.

When the mirror drive data is "1", the micromirror 2 tilts by +θ and maintains the valid reflection state. In this case, spot-like reflection light is guided to an image forming optical path 32. At this image forming optical path 32, a projector lens 33 is disposed and the spot light is projected on a photosensitive material, for example, a photographic paper 34. As the photosensitive material, a photo film and the like may be used beside the photographic paper.

The photographic paper 34 is nipped with a transport roller pair 35 and successively drawn out from a supply roll 36. The photographic paper 34 is advanced toward a take-up roll 37 at constant velocity. A pulse motor 38 for rotating the transport roller pair 35 is controlled by the controller 20 via a driver 39.

When the photographic paper 34 is advanced by predetermined length, exposure sequence is changed. As the exposure sequence, there are red exposure sequence, green exposure sequence and blue exposure sequence. In each exposure sequence, there are performed writing the mirror drive data, lighting the LED device and putting out the LED device in order. Exposure is performed during turning on the LED device.

Figure 5:
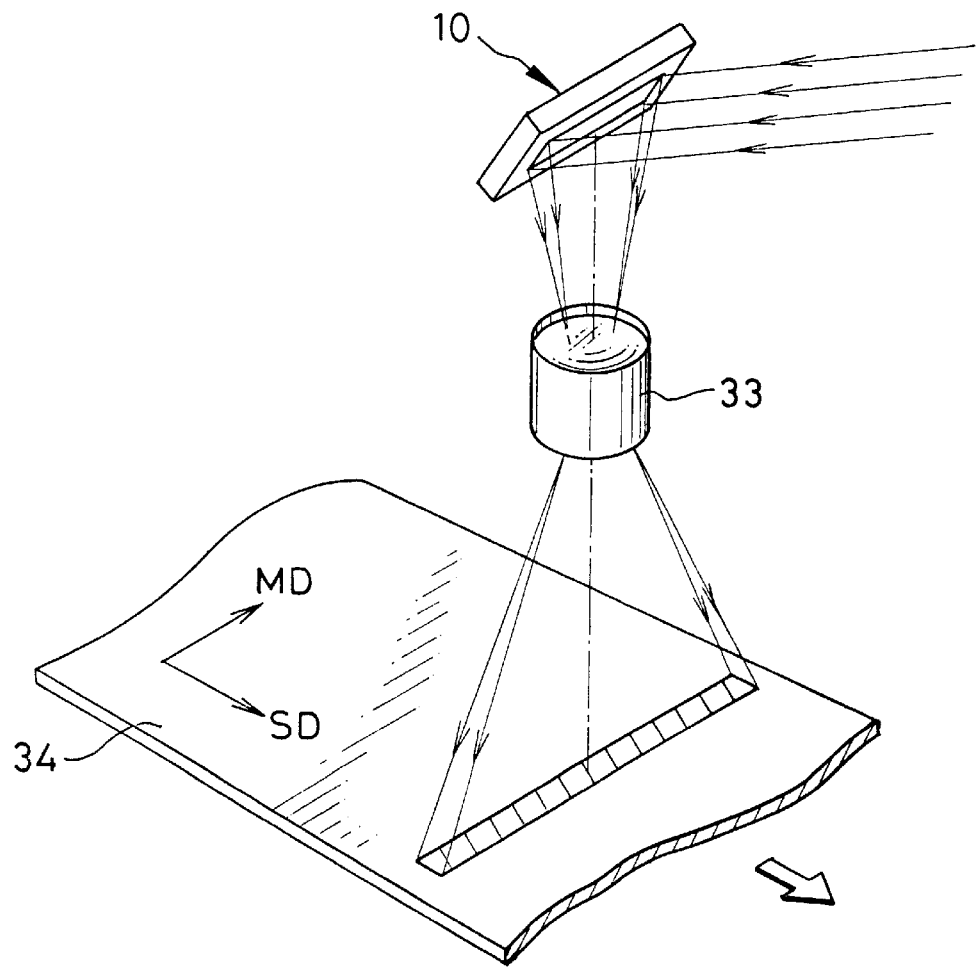
FIG. 5 is an explanatory view showing an exposure state by the digital micromirror device.

As shown in FIG. 5, in each exposure sequence, the micromirror arrays M1 to M4 of the digital micromirror device 10 are driven at the same time and the image data of four lines are recorded on the photographic paper 34 during successive advancement thereof.

Figure 7:
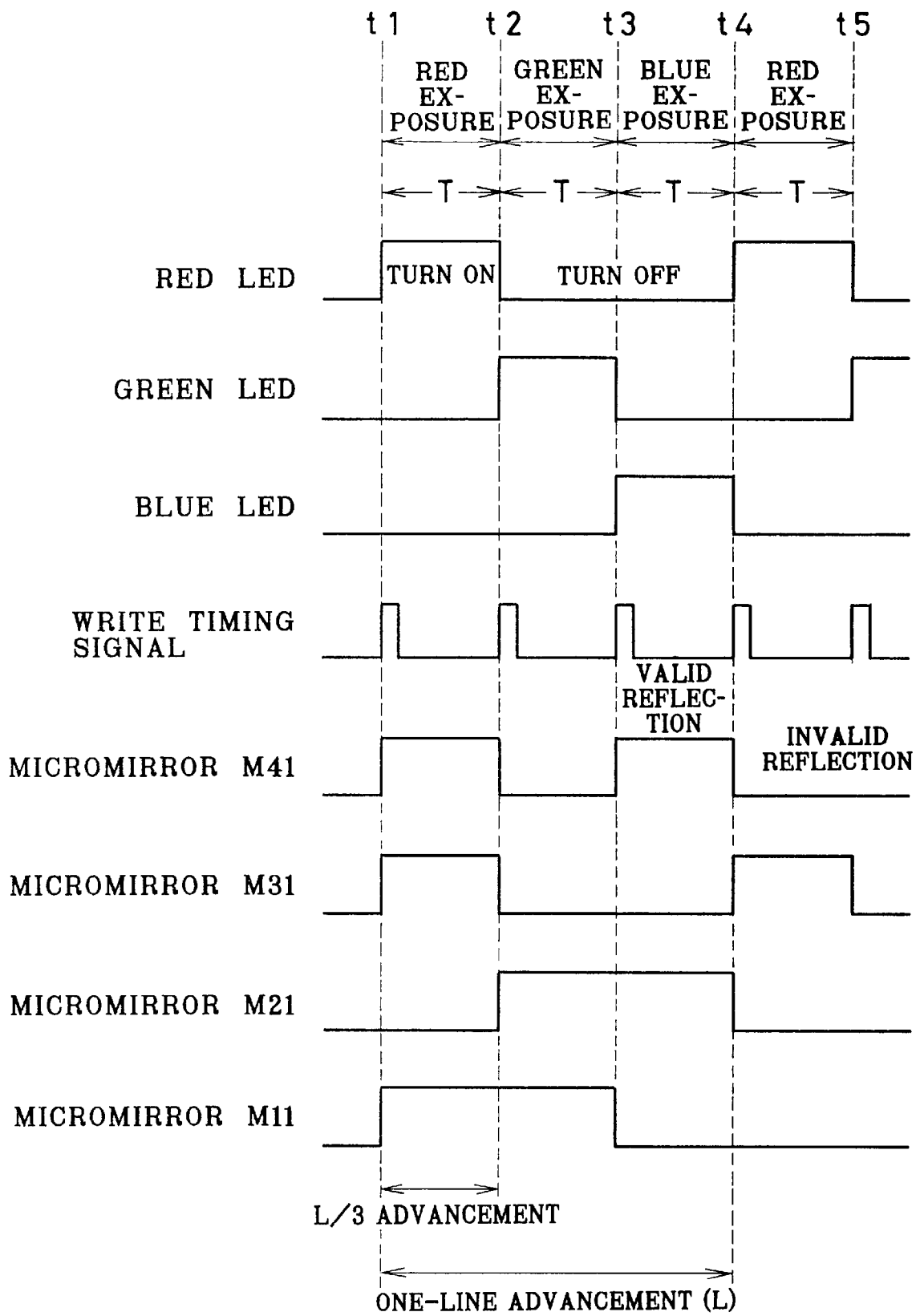
FIG. 7 is a timing chart showing exposure sequence of three colors.
Figure 8:
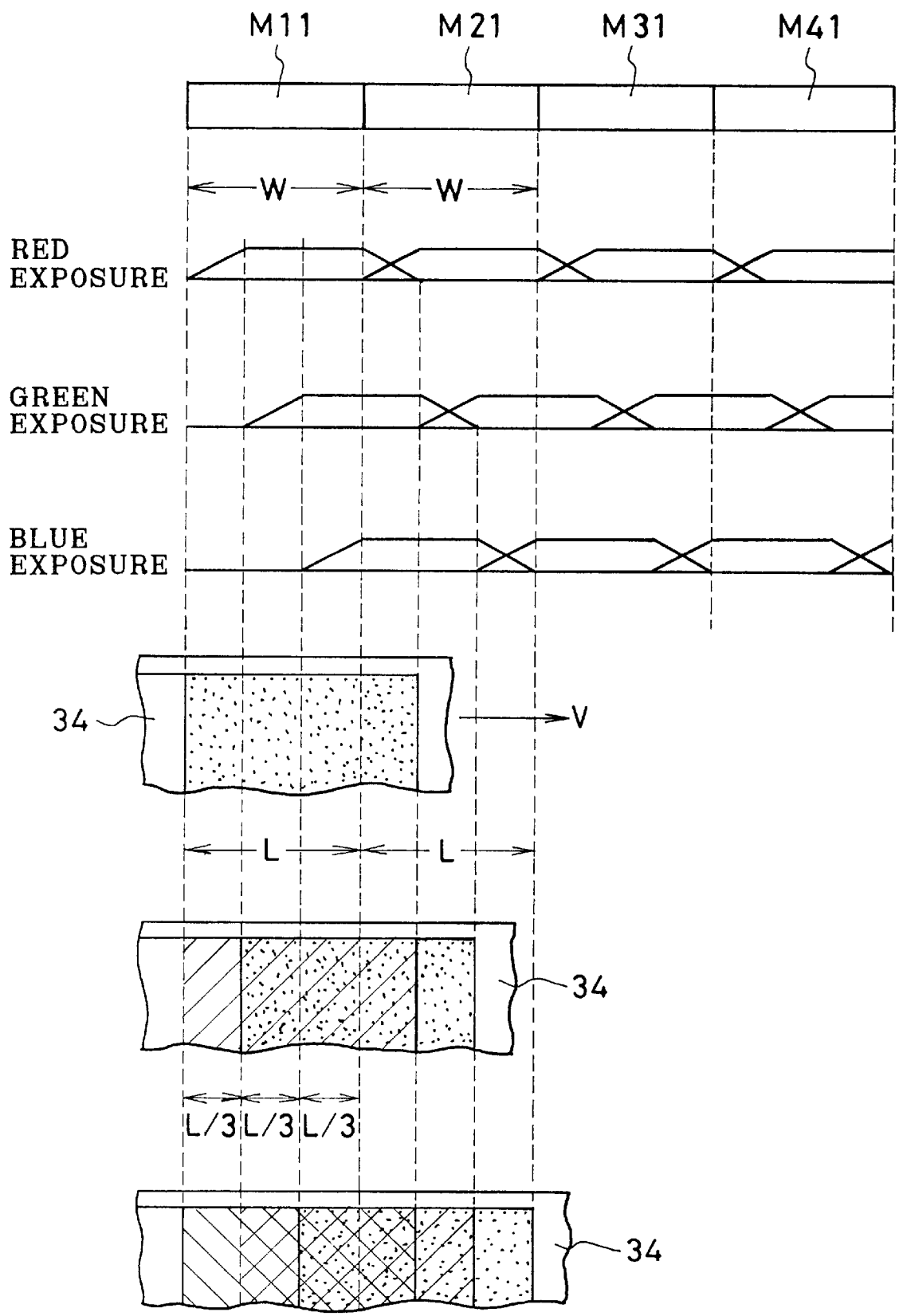
FIG. 8 is an explanatory view showing an exposure state of a photographic paper by each micromirror array.

When the magnification of the projector lens 33 is P and the width of the micromirror array, namely, the length of the micromirror array in the sub-scanning direction SD is W, the width L of one line recorded on the photographic paper 34 by one micromirror array, namely, the length L of one line in the sub-scanning direction SD is P×W (refer to FIG. 8). In this embodiment, as shown in FIG. 7, the exposure sequence is changed every advancement of photographic paper 34 by L/3. Further, it is defined that an exposure duty factor is ratio of actual exposure time to capable exposure time, in other words, the exposure duty factor is ratio of maintaining time of valid reflection state to lighting time of the light source. When the exposure duty factor is 100 percent and the advancing velocity of the photographic paper 34 is V, the exposure time T is L/(3×V). When the exposure duty factor is 50 percent, the exposure time T is L/(6×V). In FIG. 7, the exposure duty factor is 100 percent.

Next, an operation of the color printer in a state that the exposure duty factor is 100 percent is described. By the way, when the exposure duty factor is 100 percent, there are two cases. In one case, it is performed at the same time to change the micromirror 2 and turn on and off the light source. In the other case, the micromirror is changed before turning on the light source and is changed after turning out the light source. In the latter case, as the photosensitive material is successively advanced, non-exposed period is generated between two exposure sequences. In this embodiment, changing of the micromirror and turning on and out of the light source are performed at the same time.

Upon turning on a power supply, the controller 20 instructs the data write control circuit 25 to clear the digital micromirror device 10. The data write control circuit 25 writes the mirror drive data "0" to SRAM of the digital micromirror device 10 to tilt each micromirror 2 by −θ and cause it to maintain the invalid reflection state as shown in FIG. 2B.

When the print is instructed by a print key (not shown) after the image data is taken in the image memory, the controller 20 rotates the pulse motor 38 via the driver 39. The rotation of the pulse motor 38 is transmitted to the transport roller pair 35 so that the photographic paper 34 is advanced in a direction represented by an arrow shown in FIG. 4 at the constant velocity V.

The width L of one line is a width of projected light when the spot light from the micromirror array is projected on the photographic paper 34. In FIG. 8, magnification P of the projector lens 33 is adapted to be one for the sake of convenience so that the value of W is equal to that of L, namely W=L.

Upon instruction of print, the controller 20 reads out the red image data of first line to forth line from the red image memory 21 in order and sends it to the data converter circuit 24. The red image data of the first line is allocated to the forth micromirror array M4. The red image data of the second line is allocated to the third micromirror array M3. The red image data of the third line is allocated to the second micromirror array M2. And the red image data of forth line is allocated to the first micromirror array M1.

At this time, actual first line of the red image is the forth line of the red image data so that dummy data "000" is written to the first line, the second line and the third line of the red image memory 21. Instead of utilizing the dummy data, it may be possible that only red image data of the first line is read out and only first micromirror array M1 is driven on the basis of the data. The data converter circuit 24 converts each image data of four lines to one-bit mirror drive data, referring to the look-up table shown in FIG. 6.

After converting to the mirror drive data, the red exposure sequence is started. At the outset, the controller 20 writes the mirror drive data of four lines sent from the data converter circuit 24 to SRAM of the digital micromirror device 10 in synchronism with a write timing signal.

Immediately after writing the mirror drive data, the controller 20 turns on the red LED unit 11 via the LED driver 18 to illuminate the whole face of the digital micromirror device 10 so that the red exposure is started.

The micromirror 2 maintains the valid reflection state while the mirror drive data "1" is supplied, and reflects the incident red light to the image forming optical path 32 as a spot light. The red spot light is projected onto the photographic paper 34 by the projector lens 33. Thus, red spot lights of four lines become incident on the photographic paper 34 to perform the red exposure. The micromirror 2 applied with the mirror drive data "0" maintains invalid reflection state so that the reflected red spot light is guided to the eliminating optical path 27 and absorbed by the light absorbing plate 28.

During the red exposure sequence, the controller 20 reads out the green image data of first line to forth line from the green image memory 22 in order and sends it to the data converter circuit 24. The green image data of the first line to the fourth line correspond to the forth micromirror array M4 to the first micromirror array M1 respectively. Dummy data "000" is written to the first line to the third line of the green image memory. The data converter circuit 24 converts each image data of four lines to one-bit mirror drive data, referring to the look-up table.

After the red exposure sequence was performed during predetermined period, the red LED unit 11 is turned out and the red exposure sequence is over. At the same time, the green exposure sequence is started. In the green exposure sequence, the data write control circuit 25 writes the mirror drive data of four lines to SRAM of the digital micromirror device 10 in synchronism with the write timing signal so as to change the state of the micromirror. At the same time, the green LED unit 12 is turned on so that green spot lights of four lines become incident on the photographic paper 34 to perform the green exposure during predetermined period.

During the green exposure sequence, the controller 20 reads out the blue image data of the first line to the fourth line from the blue image memory 23 in order and sends it to the data converter circuit 24. The blue image data of the first line to the fourth line correspond to the forth micromirror array M4 to the first micromirror array M1 respectively. Dummy data "000" is written to the first line to the third line of the blue image memory in a similar way.

When the green exposure sequence of predetermined period is over, the blue exposure sequence is started. Upon starting the blue exposure sequence, the data write control circuit 25 writes the mirror drive data of four lines sent from the data converter circuit 24 to the digital micromirror device 10. At the same time, the blue LED unit 13 is turned on. Blue spot lights of four lines become incident on the photographic paper 34 to perform the blue exposure during predetermined period.

After the blue exposure sequence was performed during predetermined period, second red exposure sequence is performed based on the red image data of the second line to fifth line. In a similar way, second green exposure sequence and second blue exposure sequence are performed in order based on the green image data and the blue image data of second line to fifth line respectively.

In such a manner, the exposures of three colors are repeated in order. Accordingly, any line is exposed four times at the ceiling with respect to each color so that color image having five-step gradations relative to each color is recorded on the photographic paper 34. The photographic paper 34 is developed and separated every each image as hard copy.

FIG. 7 shows an exposure state of Nth line based on the condition that the exposure duty factor is 100%. The red exposure sequence is started at time t1 and terminated at time t2. In the red exposure sequence, the red LED unit 11 emits the light during period from t1 to t2 so that the first micromirror array M1 performs the red exposure for width corresponding to L+(L/3) as shown by dots in FIG. 8. In FIG. 8, a wave form of trapezoid represents an exposure amount for the photographic paper 34 due to each micromirror.

The green exposure sequence is performed during the period from t2 to t3. The first micromirror array M1 performs the green exposure for width corresponding to L+(L/3) as shown by hatching in FIG. 8. The blue exposure sequence is performed during the period from t3 to t4. During this period, the first micromirror array M1 performs the blue exposure for width corresponding to L+(L/3) as shown by cross-hatching in FIG. 8. Further, next red exposure sequence is performed during the period from t4 to t5.

Apparently from FIG. 8, the three colors are shifted by a third of a line so that a shear of color is generated. However, when the width of one line corresponds to 600 dpi, the shear of color corresponds to 1800 dpi. Accordingly, it is possible to ignore that.

Exposure is constant for a region of 2L/3 positioned at a center of each line. However, for a region of L/3 positioned at front and rear side, exposure is gradually changed so that unevenness of exposure is slightly generated at the both sides of each line. As to the region of L/3 positioned at front side, when the micromirror M21 is set in the valid reflection state, generation of unevenness of exposure is restrained due to exposure by the micromirror M21. Further, in case of four micromirror arrays, a line having width of L/3, in which density is slightly changed, is generated every 4L in principle. However, changing amount of the density does not affect the image quality.

Period of exposure sequences relative to three colors is similar to each other. However, the period of exposure sequences may be changed for each color in accordance with three-color sensitivity of the photographic paper 34 or MTF for color of the naked eye.

In the above-described embodiment, the first to fourth micromirror arrays M1 to M4 are driven in two patterns, namely the exposure duty factor is 100% or 0%. Therefore, number of gradations expressed by the micromirror arrays is in proportion to number of micromirror arrays. For example, when the number of micromirror arrays is four or sixty four, the number of gradations is respectively five or sixty five with regard to one color.

FIGS. 9 to 12 show another embodiment wherein the exposure duty factor of one of four micromirror arrays is controlled in three steps of 100%, 50% and 0%, thereby seven steps of gradations are expressed for each color with three-bit image data.

Figure 9:
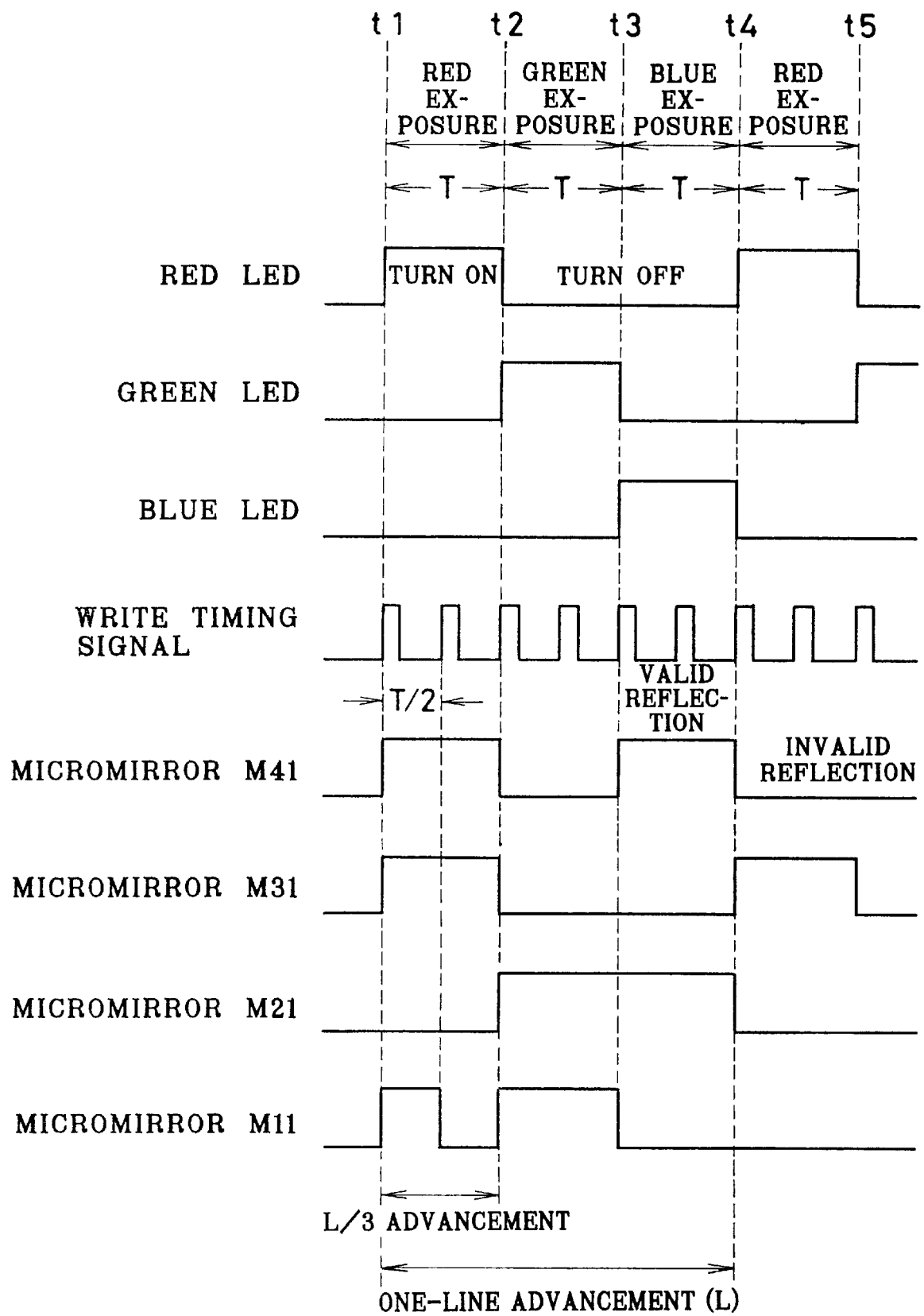
FIG. 9 is a timing chart showing an embodiment wherein first micromirror array is controlled by means of pulse width modulation.

In FIG. 9, the first micromirror M11 is set such that the exposure duty factor is 50% in red exposure sequence and is 100% in green exposure sequence. Further, the exposure duty factor is 0% in blue exposure sequence. Moreover, as to the second micromirror M21 to fourth micromirror M41, the exposure duty factor is 100% or 0%.

FIG. 10 shows a look-up table for converting the image data to the mirror drive data. The image data is converted to two-bit mirror drive data in accordance with the value thereof and the position of driven micromirror array. The two-bit mirror drive data is picked up one bit by one bit from the highest bit and written to the digital micromirror device 10 in synchronism with the write timing signal shown in FIGS. 11 and 12. The write timing signal is generated in cycle of T/2 so that writing is performed twice in each exposure sequence.

Figure 11:
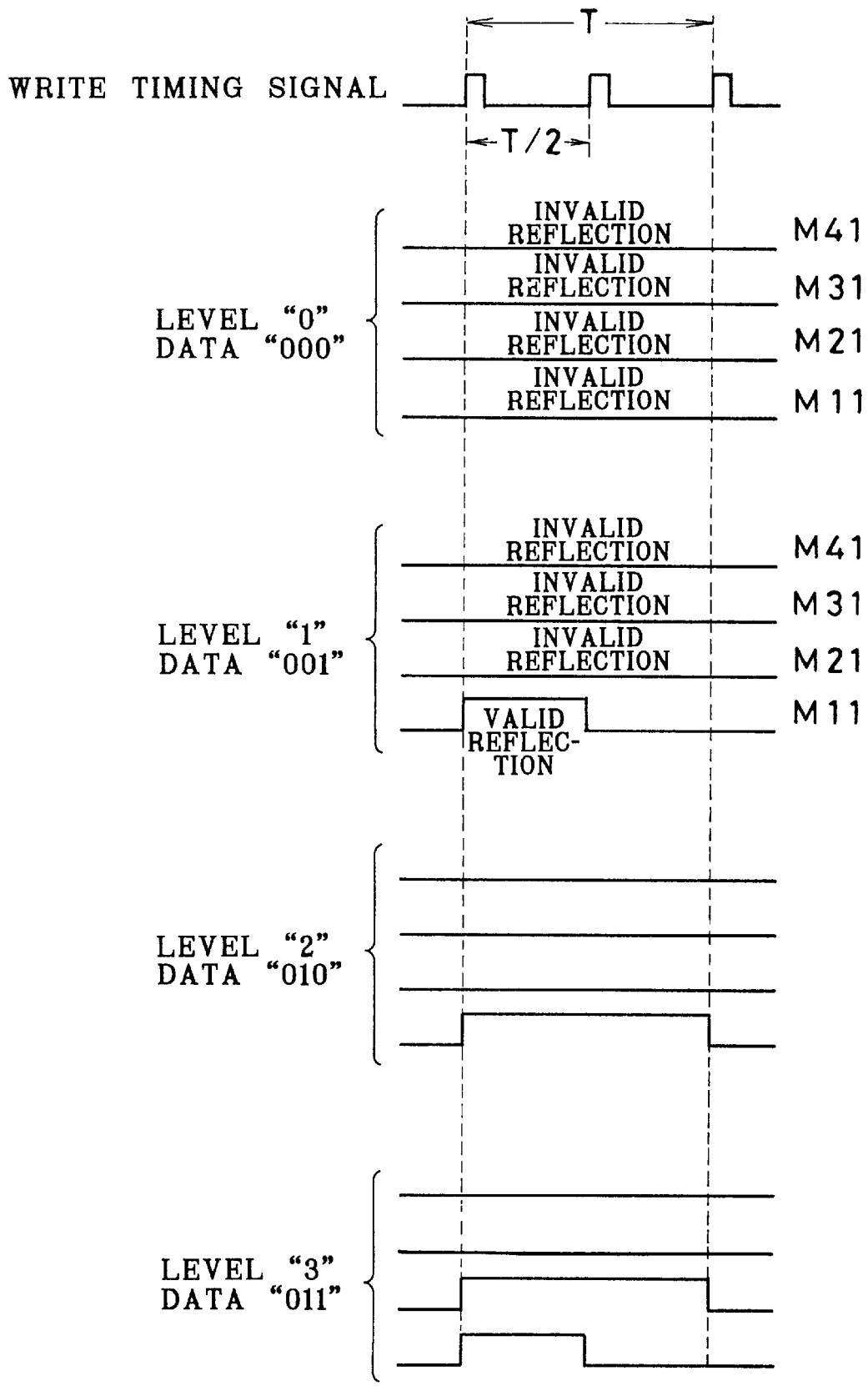
FIG. 11 is an explanatory diagram showing reflection state of the micromirrors due to the look-up table shown in FIG. 10.
Figure 12:
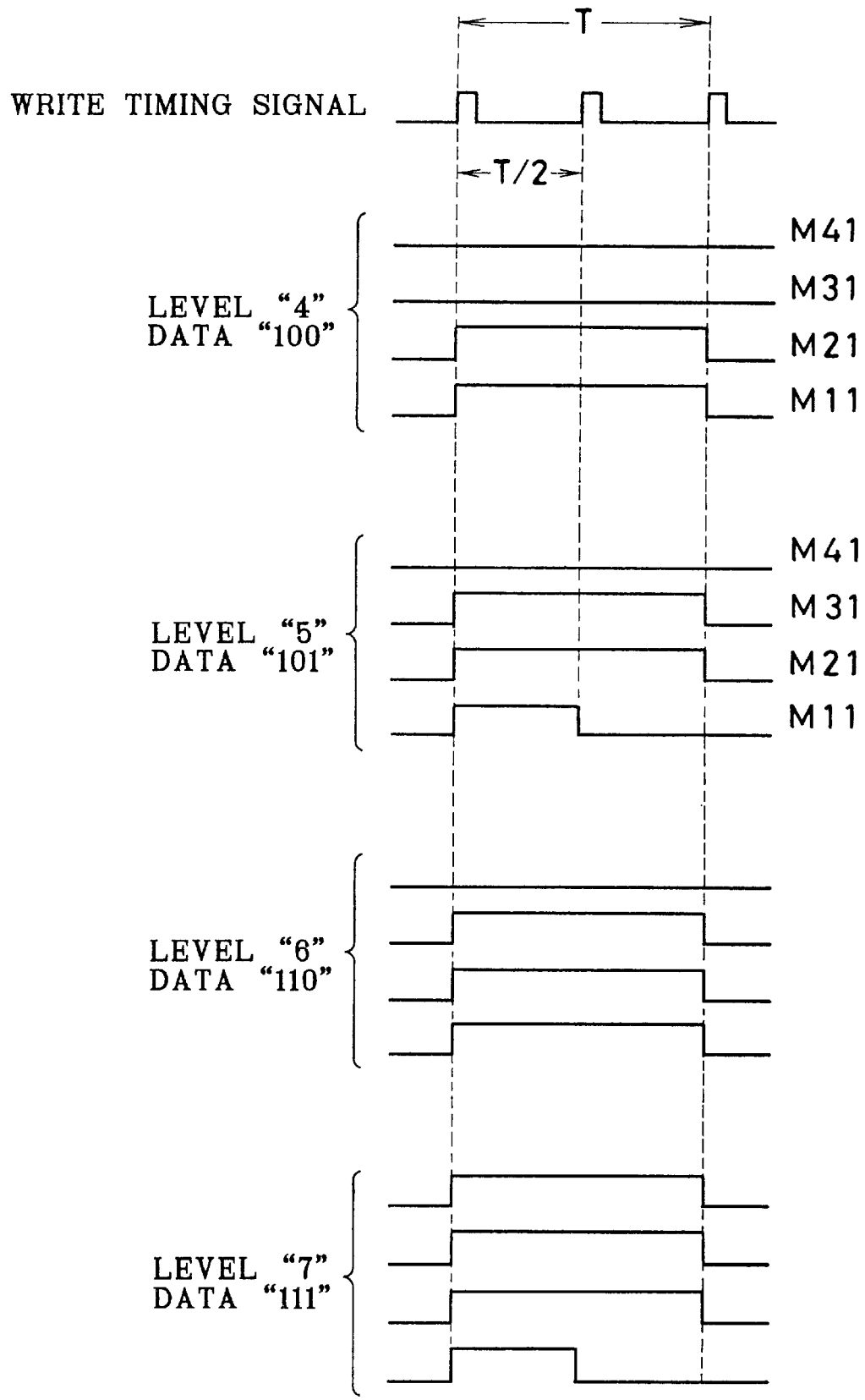
FIG. 12 is an explanatory diagram similar to FIG. 11.

FIGS. 11 and 12 show a state of multiple exposure by each of micromirrors M11 to M41. Each of micromirrors M11 to M12 is driven every when the photographic paper 34 is moved by one line, namely, every passage of time 3T.

For example, when the image data is "000", all of the micromirrors M11 to M41 are not set in the valid reflection state so that the total exposure time is zero. When the image data is "001", only the micromirror M11 is set in the valid reflection state during the time of T/2 so that the exposure duty factor due to the micromirror M11 becomes 50%. The micromirrors M21 to M41 are not set in the valid reflection state when the image data is "001" so that the total exposure time for pixel on which multiple exposure is performed by micromirrors M11 to M41 becomes T/2.

When the image data is "011", the micromirror M1 is set in the valid reflection state during the time of T/2. And after the photographic paper was moved by one line, the micromirror M21 is set in the valid reflection state during the time of T. In this case, the micromirrors M31 and M41 are set in the invalid reflection state. Accordingly, multiple exposure is performed by the micromirrors M11 and M21 and the total exposure time becomes 3T/2.

When the image data is "111", exposure time due to the micromirror M11 is T/2 and exposure time due to micromirrors M21 to M41 is T respectively. The multiple exposure is performed by the four micromirrors M11 to M41 and the total exposure time becomes 7T/2.

As to the second micromirror array M2 to fourth micromirror array M4, the exposure duty factor is 100% or 0% so that the two-bit mirror drive data is either of "00" and "11". FIG. 13 shows an embodiment wherein one-bit mirror drive data, namely "0" or "1", is allocated for the second micromirror array M2 to fourth micromirror array M4. In this case, write of the mirror drive data is performed only once in a exposure sequence so that it becomes simple to write the data.

Figure 14:
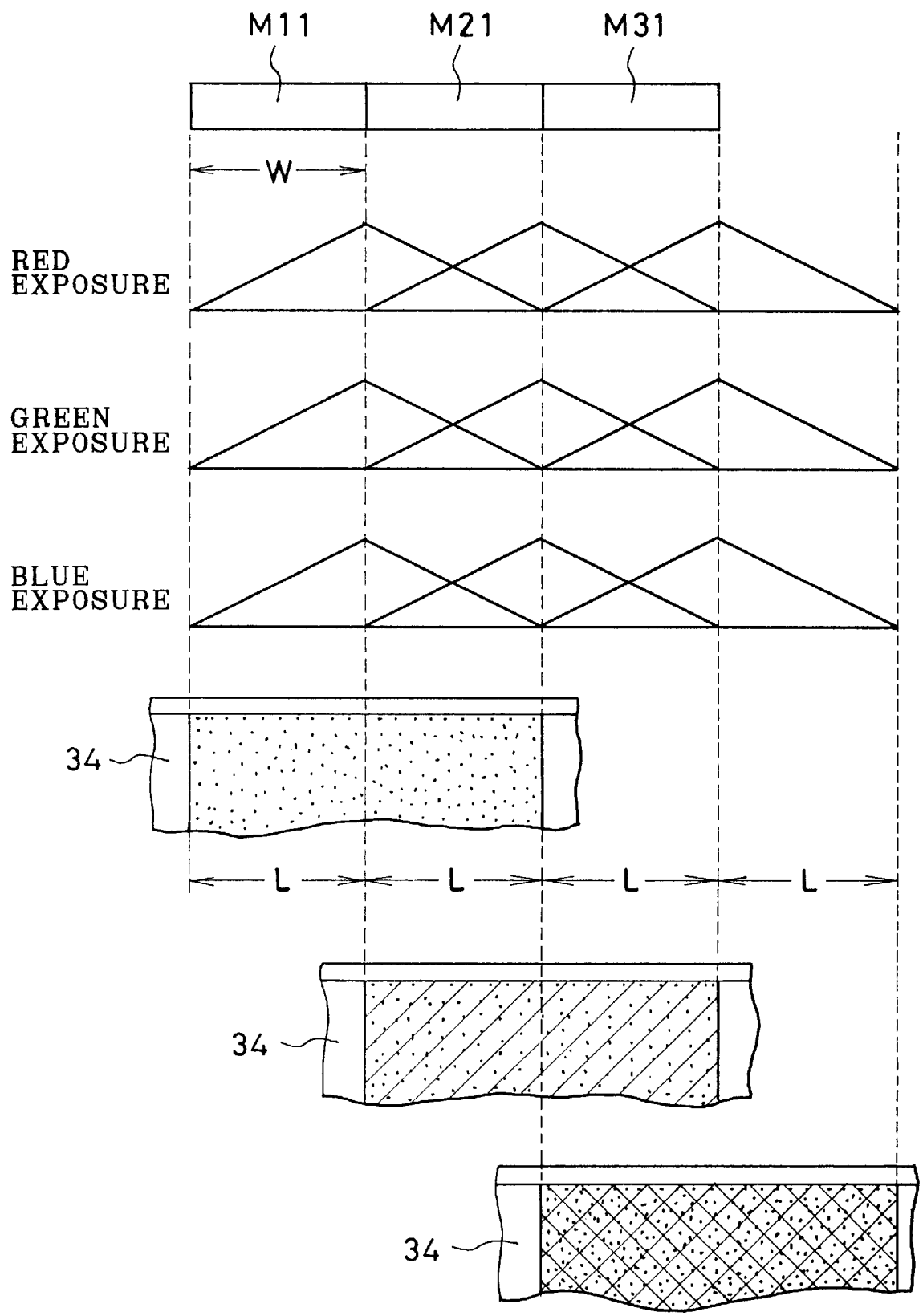
FIG. 14 is a timing chart showing an embodiment wherein the exposure sequence is changed every one line.

FIG. 14 shows an embodiment wherein the exposure sequence is changed every advancement of the photographic paper by L corresponding to the width of one line. In other words, the exposure sequence is changed every line. In this case, number of exposures should be same for each color. Therefore, it is necessary to provide micromirror arrays of number corresponding to integral number times three, namely, three, six, nine and so on.

In FIG. 14, three micromirror arrays are employed so that line multiple exposure is not performed relative to each color. However, in case of six micromirror arrays, the line multiple exposure may be performed twice for each color. In FIG. 14, dots represent the red exposure by the micromirror M11 and hatching represents the green exposure by the micromirror M21. Further, cross-hatching represents the blue exposure by the micromirror M31. Three colors lie one upon another in line completely so that a shear of color is not generated. This embodiment has an advantage that it is possible to prolong changing cycle of the light source and write cycle of the mirror drive data.

However, exposure amount relative to each line is changed in a triangular form so that the unevenness of exposure is generated in the whole of line. Of course, the unevenness of exposure in each line is improved by the reflection state of front and behind micromirrors. Moreover, the unevenness of exposure may be improved by reducing the exposure duty factor to decrease the exposure amount of each time.

In the embodiment shown in FIGS. 9 to 12, the exposure duty factor is changed in three steps by pulse width modulation for the only first micromirror array M1. By increasing the number of the steps, gradations of more many steps may be expressed. In this case, mirror drive data having a number of bits corresponding to the number of the steps are used. Alternatively, the pulse width modulation may be performed for not only the first micromirror array M1 but also the second micromirror array M2.

The present invention may be utilized for a dot pattern method wherein a pixel is constituted of a plurality of dots. For example, the exposure duty factor is set in two steps of 100% and 0% for sixty micromirror arrays and the pulse width modulation based on three-bit data is performed for two micromirror arrays. And if a pixel is recorded by 2×2 micromirrors, gradation of 1952(=61×8×4) steps may be expressed for each color. In this case, color image, density resolution of which is 0.01 and maximum optical density of which is about 2.5, may be recorded on the photographic paper 34 for each color.

In the above-described embodiment, the micromirrors are arranged in matrix. However, it is possible to use a micromirror device in which micromirrors of adjacent micromirror array are shifted by half pitch in main scanning direction, in other words, the micromirrors are disposed in zigzag-like manner.

When a photographic paper of positive-positive type is used, the digital micromirror device is driven by utilizing image data of positive image. When a photographic paper of negative-positive type is used, image data inverted to negative image is utilized. Further, the present invention may be applied for a color printer in which piezoelectric drive type micromirror device is built.

As to the photosensitive material, there is an infrared photosensitive material provided with three kinds of photosensitive layers which are sensitive in accordance with wavelength band of infrared radiation. The infrared photosensitive material is colored in cyan, magenta and yellow by development process. When the infrared photosensitive material is utilized, three infrared radiation emitting units are used as light sources. The infrared radiation emitting units radiate three kinds of infrared radiations whose wavelength bands are different from each other.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color printer for printing a color image on a photosensitive material, comprising:

a micromirror device provided with N (N is an optional natural number) micromirror arrays which are juxtaposed and each of which has M (M is an optional natural number) micromirrors arranged in line, said micromirror being changeable between a valid reflection state in that light is reflected to an image forming optical path and an invalid reflection state in that light is reflected to an eliminating optical path;

advancing means for successively moving said photosensitive material in perpendicular direction to said micromirror arrays;

sequence control means for performing a first exposure sequence, a second exposure sequence and a third exposure sequence in order in synchronism with advancement of said photosensitive material by said advancing means, said first exposure sequence being performed by light of first wavelength band, said second exposure sequence being performed by light of second wavelength band and said third exposure sequence being performed by light of third wavelength band;

driving means for driving said N micromirror arrays in accordance with image data of N lines relative to each of said exposure sequences;

a first light source for applying said light of first wavelength band to said micromirror device in said first exposure sequence;

a second light source for applying said light of second wavelength band to said micromirror device in said second exposure sequence;

a third light source for applying said light of third wavelength band to said micromirror device in said third exposure sequence; and projecting optical system for projecting reflected light from said micromirror set in said valid reflection state on said photosensitive material.

2. A color printer according to claim 1, wherein each of said first to third light sources is LED unit.

3. A color printer according to claim 2, wherein said light from each of said first to third light sources is applied to said micromirror device via a balance filter, said balance filter performing shading correction.

4. A color printer according to claim 1, wherein said photosensitive material is a color silver salt photosensitive material, said light of first wavelength band is light of red sensitive range for said color silver salt photosensitive material, said light of second wavelength band is light of green sensitive range for said color silver salt photosensitive material and said light of third wavelength band is light of blue sensitive range for said color silver salt photosensitive material.

5. A color printer according to claim 4, wherein said photosensitive material is a photographic paper or a film.

6. A color printer according to claim 4, wherein said sequence control means changes said exposures sequence so as to perform said first to third exposure sequences in order while said photographic material is advanced by one line of said color image.

7. A color printer according to claim 6, wherein each of said exposure sequences is performed while said photosensitive material is advanced by a third of said one line of said color image.

8. A color printer according to claim 4, wherein said N is a multiple of three, and said sequence control means changes said exposure sequence every advancement of said photosensitive material by one line of said color image.

9. A color printer according to claim 1, wherein each of said micromirrors is changed between said valid reflection state and said invalid reflection state by static electricity force.

10. A color printer according to claim 1, wherein at least one of said N micromirror arrays is controlled relative to period of said valid reflection state in each said exposure sequence, and for rest of said N micromirror arrays, said period of said valid reflection state is constant in each said exposure sequence.

* * * * *